Aug. 29, 1933.  F. T. EVERSON  1,925,046
GROOVED PULLEY
Filed Nov. 19, 1930
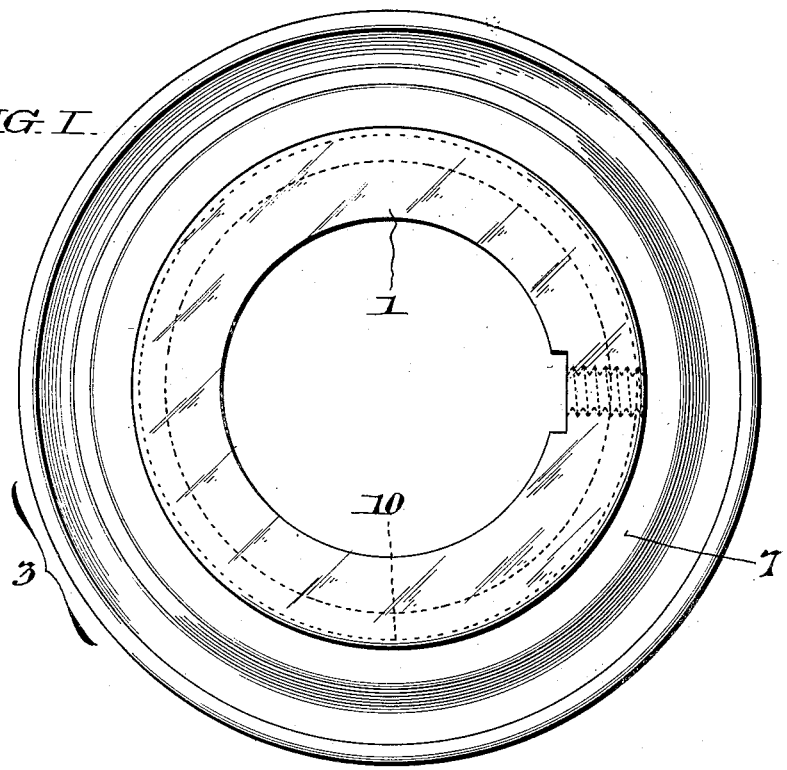
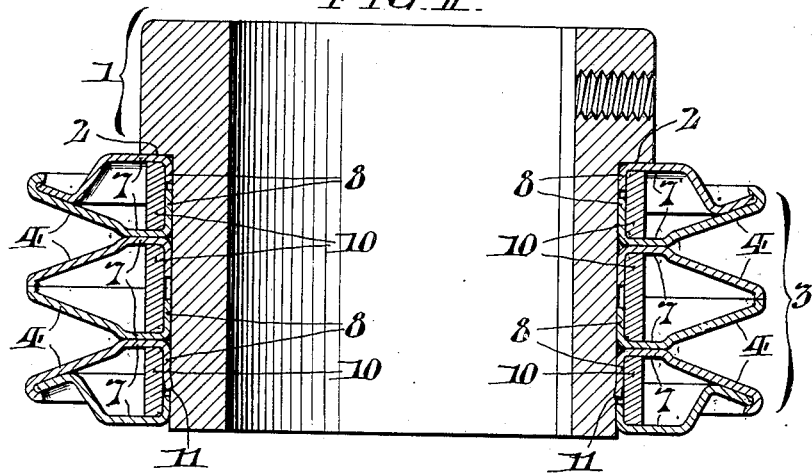
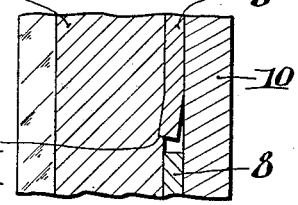
WITNESSES
INVENTOR.
Frank T. Everson,
BY
ATTORNEYS.

Patented Aug. 29, 1933

1,925,046

UNITED STATES PATENT OFFICE 1,925,046

GROOVED PULLEY

Frank T. Everson, Manoa, Pa., assignor to The American Pulley Company, Philadelphia, Pa., a corporation of Pennsylvania Application November 19, 1930
Serial No. 496,765

3 Claims. (Cl. 64—17)

My invention relates to the construction of a grooved pulley, usually a multi-grooved pulley, the perimeter of which is built up by the juxtaposition upon a hub of annular stamped metal disks secured thereto, each disk including an inclined portion which forms one wall of a groove, and each disk being flanged and secured to the hub preferably by the compression of a collar surrounding the flange and the hub and clamping them together. Each collar is preferably sufficiently broad to secure the flanges of two adjacent disks. The multi-grooved pulley is built up by the successive juxtaposition upon the hub, and the fixture thereon by surrounding collars, of alternately reversed annular paired disks, forced onto the hub until the extreme disk engages a shoulder thereon. This shoulder prevents lateral displacement of the disks in one direction, and it is the object of my invention to prevent possible lateral displacement of the disks in the other direction, that is towards the end of the hub which has no shoulder. This I accomplish by cutting one or more small grooves around the circumference of the hub in position to engage the sprung edge of the flange of one of the disks, preferably the extreme disk, whereby this disk and all between it and the shoulder are locked against lateral displacement.

In the accompanying drawing I have illustrated my invention by showing in Fig. I an end view of a pulley embodying my invention;

In Fig. II, an axial section of the same; and,

In Fig. III an enlarged sectional view of the same character to illustrate the nature of the groove and the springing of the edge of the flange therein.

The hub 1 is provided with a shoulder 2. The hub 1 is preferably hollow with capacity for splining upon a main shaft.

The perimeter of the puley is built up by the paired juxtaposition upon the hub 1 of annular disks 3. Each disk 3 comprises an outer inclined surface 4 reaching to the perimeter of said disk which forms one wall or sill of a groove. Each disks is formed with a somewhat tubular flange 8 at the inner edge. The portion of the disk 3 which connects the flange 8 and the inclined surface 4 includes a straight web 7. By placing these annular disks 3 upon the hub 1 in alternately reversed position as shown, a grooved pulley is built up; and by repeating the same operation, a multi-grooved perimeter for the pulley with any desired number of grooves may be formed, each adjoining pair of inclined surfaces 4 forming a single groove.

Two adjacent disks 3 which contact at their outer perimeters may be secured to the hub 1 by a single collar 10 having such dimensions that the flanges 8 of the two disks are clamped between it and said hub, one passing around one edge and the other around the other edge of the collar 10.

These parts are shaped so as to make a driving fit on the hub 1, so that the compression of the collar 10 secures its disks 3 in place against both lateral strain and torque.

The extreme disks 3 may be shaped differently from the others, their inner edges forming a flange 8 and their outer edge being bent so that the perimeter is caught under the hooked outer perimeter of the adjoining disk 3 as shown clearly in Fig. II.

In building up the pulley the disks 3 and the collars 10, properly allocated, are driven onto the hub 1 until the extreme disks 3 is brought up against the shoulder 2 and succeeding disks 3 forced close up against each other.

My invention aims to better secure such an aggregation of disks 3 from displacement by lateral strain. Such displacement can only occur towards the end of the hub 1 which has no shoulder. I accordingly cut one or more shallow grooves 11 around the circumference of the hub near this end in such position that the flange 8 of the disk 3 which surrounds it may be sprung into this groove, as shown in Figs. II and III. By bending the flange 8 as shown, the inner edge when forced upon the hub 1 will engage the groove 11 around the hub 1 and effectually prevent possible end displacement which might otherwise occur should the driving fit of the collars 10 upon the disks 3 be insufficient to resist it.

Having thus described my invention, I claim:

1. A grooved pulley formed by the juxtaposition of correspondingly-shaped disks each having an inner tubular flange for forced engagement upon a hub, a shoulder around said hub for abutment by the side of one disk adjoining the tubular flange of the latter, another disk tubular flange having its free edge wholly and inwardly-sprung, and an angular groove around the hub in position for engagement by the inwardly-sprung free edge of the last mentioned tubular flange whereby the disks are securely locked against axial displacement.

2. A multi-grooved pulley formed by the juxtaposition of alternately-reversed correspondingly-shaped disks upon a hub, each said disk embodying an outer inclined groove wall and an inner hub-contacting tubular flange, and one of said disk flanges having its free edge inwardly sprung; and a circumferential groove around said hub adapted to be engaged by the sprung inner edge of the last mentioned disk flange to prevent axial displacement of the disks as a whole.

3. A multi-grooved pulley formed by the juxtaposition of alternately-reversed correspondingly-shaped disks upon a hub having a shoulder at one end, each said disk embodying an outer inclined groove wall and an inner hub-contacting tubular flange with an intervening straight web portion, one of said disks having the free end of its tubular flange inwardly sprung; and a circumferential groove around said hub in position to be engaged by the sprung inner edge of the last mentioned disk flange to prevent axial displacement of the disks as a whole relative to the hub shoulder.

FRANK T. EVERSON.